United States Patent [19]

Kuperman et al.

[11] 4,377,824
[45] Mar. 22, 1983

[54] MULTI-CHANNEL LONGITUDINAL VIDEO TAPE RECORDING

[75] Inventors: Gilbert G. Kuperman, Dayton; Donald E. Lewis, Montgomery County, both of Ohio

[73] Assignee: The United States of America as represented by the Secretary of the Air Force, Washington, D.C.

[21] Appl. No.: 251,696

[22] Filed: Apr. 7, 1981

Related U.S. Application Data

[63] Continuation-in-part of Ser. No. 115,845, Jan. 28, 1980, abandoned.

[51] Int. Cl.³ ............................................. H04N 5/785
[52] U.S. Cl. .................................. 360/10.3; 360/14.2
[58] Field of Search ..................... 360/9.1, 10.1, 10.3, 360/14.1, 14.2, 14.3, 11.1, 36.1, 37.1, 22, 23; 358/311, 312, 323, 326, 335

[56] References Cited

U.S. PATENT DOCUMENTS

| | | | |
|---|---|---|---|
| 2,823,255 | 2/1958 | Hall | 360/23 |
| 2,918,524 | 12/1959 | Hume | 360/14.1 |
| 3,372,228 | 3/1968 | Law | 360/11.1 |
| 3,939,490 | 2/1976 | Opelt | 360/14.2 |
| 3,962,725 | 6/1976 | Lemke et al. | 360/36.1 |

OTHER PUBLICATIONS

Hansen, *Introduction to Solid State Television Systems Color and Black and White*, Chapter 7, Prentice Hall, Copyright 1969.

Brochure for Ampex FR-3030 Wideband Instrumentation Recorder.
Brochure for Honeywell Model Ninety-Six Laboratory System Magnetic Tape Recorders/Reproducers.
Specification Sheet for Sync Stripper 302-2, Colorado Video Inc.
Specification Sheet for Data Insertion Generator 603, Colorado Video Inc.

*Primary Examiner*—Bernard Konick
*Assistant Examiner*—Donald McElheny, Jr.
*Attorney, Agent, or Firm*—Donald J. Singer; Bernard E. Franz

[57] ABSTRACT

An apparatus and method for recording and reproducing extended periods of video information on a longitudinal tape recorder without losing synchronism or image quality. The composite video signal, and synchronization signals extracted therefrom, are recorded in spatial registry on separate channels of a longitudinal tape recorder/reproducer. Vertical synchronization quality is maintained by recording on a channel capable of low frequency processing. Upon reproduction all synchronization, including mixing with supplemental video sources, is synchronized to the recorded master video synchronization and blanking signals. Video display at other than normal speeds is temporally synchronized from the slower tape speed. An X-Y monitor driven by vertical and horizontal sweep signals synchronized to the corresponding recorded synchronization signals generates a video presentation without repeated or omitted frames.

9 Claims, 2 Drawing Figures

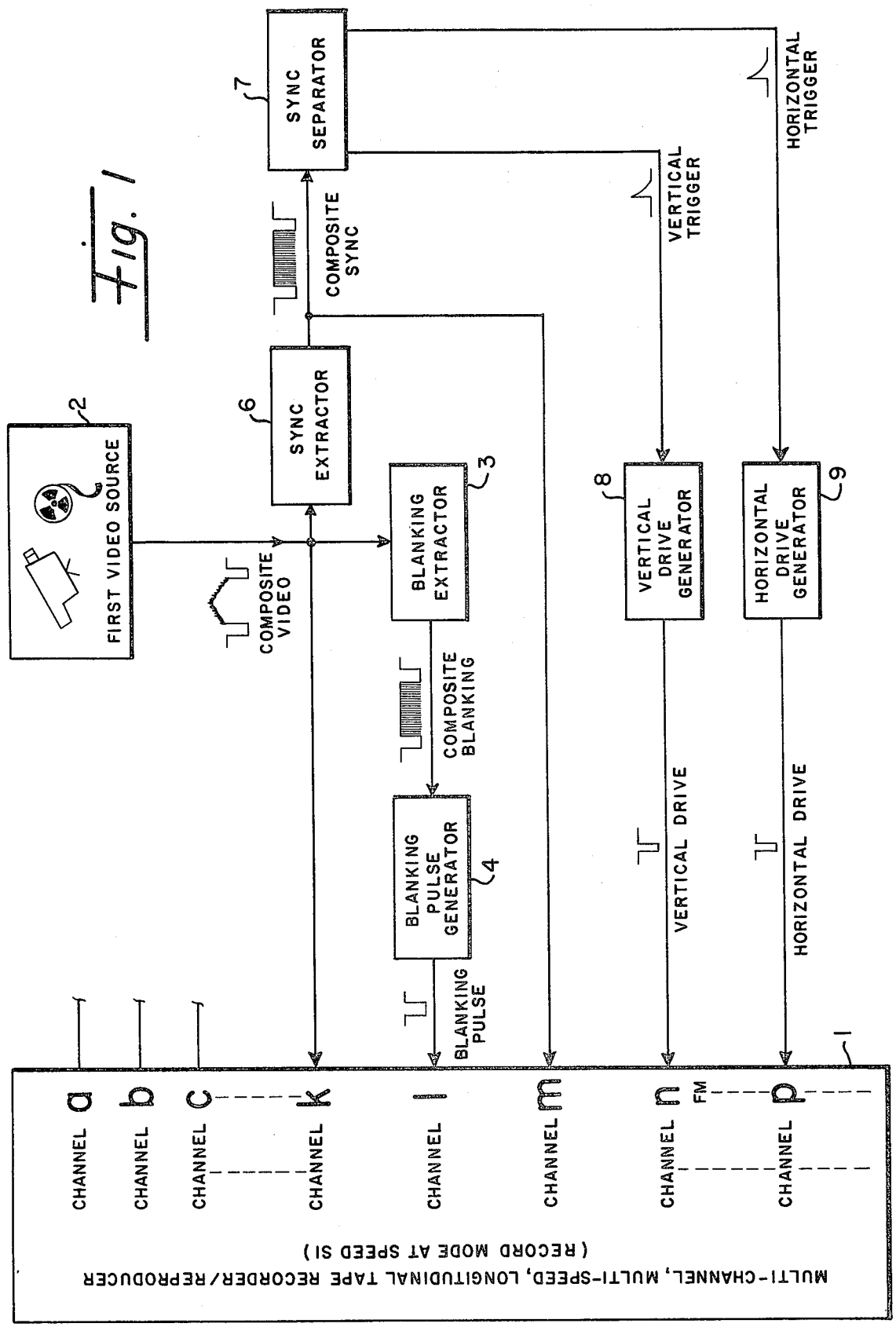

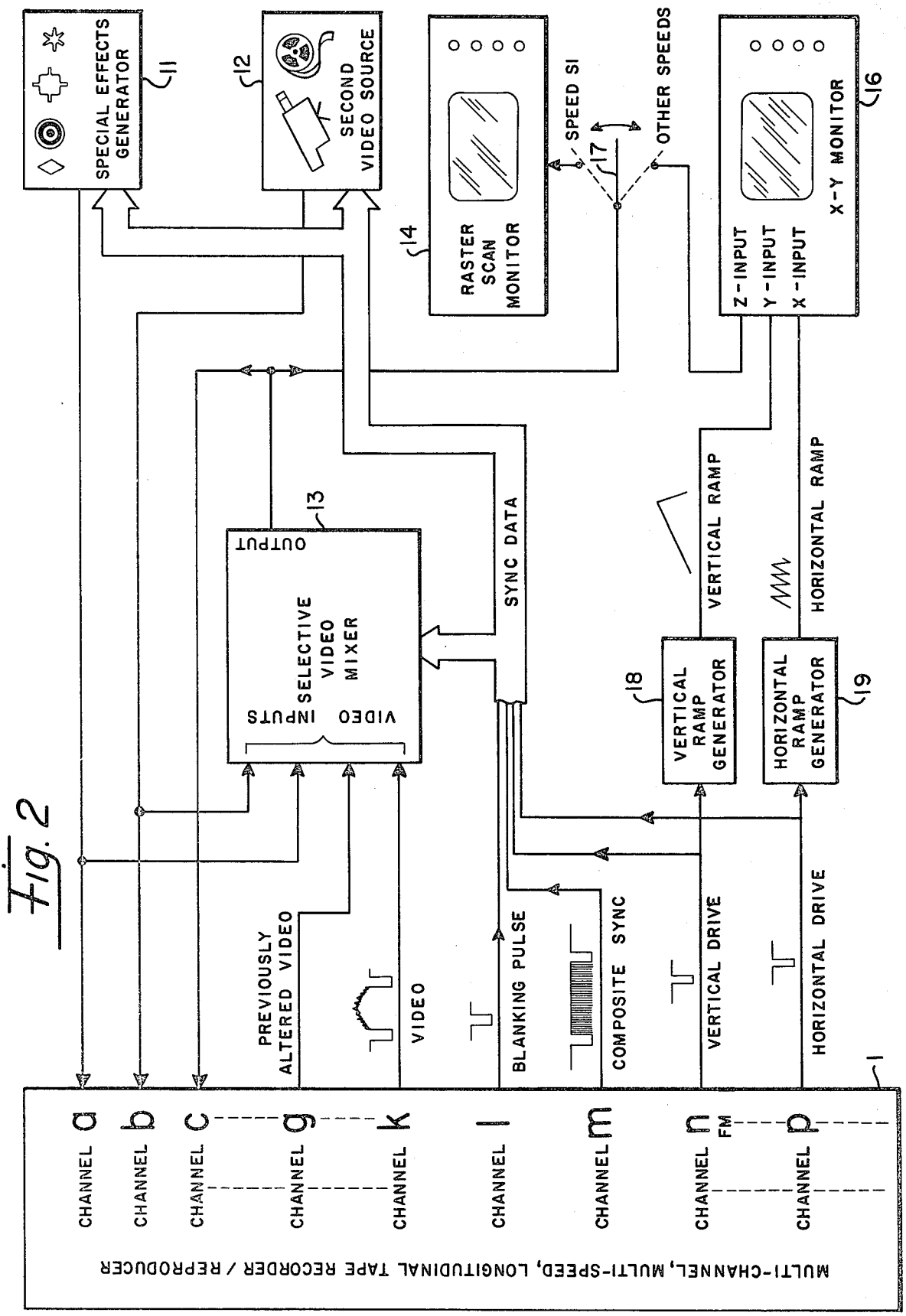

MULTI-CHANNEL LONGITUDINAL VIDEO TAPE RECORDING

RIGHTS OF THE GOVERNMENT

The invention described herein may be manufactured and used by or for the Government of the United States for all governmental purposes without payment of any royalty.

RELATED APPLICATION

This is a continuation-in-part of my copending application Ser. No. 115,845 filed Jan. 28, 1980 now abandoned.

BACKGROUND OF THE INVENTION

This invention relates to superimposition of television images, and more particularly to the field of using video tape recording to superimpose images on an original master recording.

Visual displays are frequently used to present images of patterns or scenes lying outside the range of normal human visual perception. In most cases the images vary temporally while presenting a comparatively high density of information in the form of partially disguised objects of interest, of which only a select few are actually being sought. Human factors analysis attempts to quantify the ability of the human observers to detect and distinguish important aspects of objects dispursed within such images, in a form readily amenable to comparison.

In the course of such analysis it is necessary to record, reproduce and selectively alter images while retaining a high degree of temporal precision in the composite signals. Included in these modifications of the master image are cueing techniques, to supplement the human sense with the high speed electronic analysis of video signals, slow-motion reproductions, split screen presentations, and built-in self test modes. The overriding consideration in all the approaches is the need for synchronization with, and repeatability of, the master video signal.

Insertion of cueing signals into or upon a master image for purposes of designation provides an example through which deficiencies in conventional recording and reproduction systems can be distinctly displayed. First, consider the use of a video magnetic disc type recorder. Though a copy of the master video, with cueing signals inserted, could be generated for recording onto such a recorder, the present technology limits operating time to approximately 30 seconds. Similarly, if cueing or other signal modifications are to be extracted from such a magnetic disc recorder for use during display, the severe time restriction also exists. U.S. Pat. No. 4,157,572 is a case in point, where a video magnetic disc recorder is utilized, but by nature of its operating time restriction provides no more than a cyclic repeat of a single video presentation.

The helical scan represents the remaining technological standard in video recorders. Though it overcomes the operating time restrictions of the video disc type, the helical scan recorder is inherently restricted in other ways from direct use in the application described. As a first instance, helical scan recorders are, as a general rule, limited to one signal channel. Temporally concurrent signals which are spatially synchronized to the master video are not feasible with the same tape, while using multiple video tapes and recorders will obviously succumb to synchronization problems. Though a multiple channel helical scan video recorder may overcome synchronization degradation, slow motion effects are limited to those which can be generated by undertaking multiple, successive scans of identical frames or fields. As such, the flexibility inherent in using an X-Y monitor for slow motion reproduction, in place of the conventional raster scan, is not attainable.

Undoubtedly, one moderately skilled in the art recognizes that the well known longitudinal recorder has not been discussed for video recording and reproduction. The lack of extensive use tends to focus on two well known deficiencies, which are in part interrelated. First, recording of the composite video signal in conventional manner creates jitter during reproduction, a phenomenon attributable to deficient low frequency response in comparison to the precision required to maintain accurate vertical synchronization. Stated otherwise, the broad frequency bandwidth of the composite video signal is fundamentally incompatible with the limited frequency capabilities of the longitudinal recorder, appearing in most cases as a low quality reproduction of the lower end frequencies. The second, and equally distasteful aspect of using a longitudinal recorder for composite video signals, lies in the high tape speed rate necessary to record and reproduce video signals with reasonable accuracy. Undoubtedly, tape speed can be reduced at the sacrifice of picture quality. However, the above noted problem with vertical synchronization, as well as horizontal synchronization, rapidly bound the reduction that can be achieved. Even nominal errors in synchronization destroy the whole video presentation.

BRIEF SUMMARY

The present invention is directed to an apparatus and method for its use by which a master video signal is recorded and reproduced in registry with other video signals, entailing no loss in synchronization upon reproduction irrespective of speed. Comparatively long term composite video signals are recorded on a multi-channel longitudinal tape recorder, with distinct channels of processed synchronization signals in spatial registry on the same tape. The comparatively low fundamental frequency of the vertical synchronization signal is precisely recorded and reproduced by FM processing.

Spatial registry of video and synchronization signals on the longitudinal tape corresponds to perfect temporal registry upon reproduction. Raster scan monitor presentation of the video signal, including both the master and the supplemental signals mixed therewith, is maintained by synchronizing with the specially processed synchronization signals on the tape. The degrading effects normally associated with repeated recordings of the master video, in the process of sequentially modifying the presentation with special effects signal, etc., are avoided by synchronizing to the single, precise, spatially registered group of synchronization signals in registry with the video signals.

Slow motion and high speed reproductions of the video presentation, without repeated presentations or sequential omissions of video frames, is feasible from the inherent registry of the video and synchronization data. An X-Y monitor driven by synchronized vertical and horizontal ramp generators replaces the conventional raster scan monitor.

DESCRIPTION OF THE DRAWINGS

FIG. 1 is a schematic of the functional elements in the apparatus when the master video is recorded.

FIG. 2 is a schematic block diagram of the elements during reproduction and simultaneous recording of any desired addition to, or modification of the master video.

DETAILED DESCRIPTION

The system is described in our paper entitled "Non-conventional Application of Longitudinal Tape Recording to Simulation of Cued Sensor Imagery" published in the *Journal of Applied Photographic Engineering*, Vol. 6, No. 5, October 1980, pages 126–130.

Attention is now directed to FIG. 1 where one aspect of the invention is schematically embodied in block diagram form. The structure depicted conforms to that used during the recording of the master video signal onto the tape of a longitudinal recorder. Cueing, image splitting and various other alterations to the master video signal are injected during reproduction of the master signals. Those aspects of the invention will be described with reference to FIG. 2. Multi-channel, multi-speed longitudinal tape recorder 1 is shown to contain channels generally designated by alphabetic letters beginning with "A". Each such channel is bidirectional, in that signals can be recorded onto or reproduced from the tape therethrough. At record speed S1 the embodying recorder has a bandwidth in the range of 3–5 MHz, a response characteristic of instrument type machines. Typical suitable instrument type machines include the Honeywell Model Ninety-Six, and the Ampex FR-3030 or FR 3020/30. Brochures of these systems received during the year 1979 (see file of parent application) describe operation up to 240 inches per second. With a record speed S1 of 120 inches per second, typical editing speed may be 30 to 60 inches per second, though acceptable performance has been shown at rates as low as 15 inches per second.

One or more of the channels in recorder 1 are FM record/reproduce channels. For reason articulated hereinafter the vertical synchronization signal is shown to be recorded on such an FM channel, designated by the letter N. Other video or cueing signals are equally amenable to processing through an FM channel in recorder 1, as long as the channel and signal frequency bandwidths are compatible.

During the recording of the master video signal, five distinct channels of the recorder are utilized. Recorder channel K receives the composite video signal, in the manner of a conventional video recording. Channel K will adequately record at least the picture information, but the vertical synchronization signal will be lost because of frequency limitation. Blanking pulse signals are recorded on channel L, the composite synchronization signal on channel M and the horizontal drive signal on channel P. The remaining channels, including those specifically designated A-C, are available for recording spatially and temporally concurrent signals.

The composite video signal originates in first video source 2, including but not limited to a television camera or video tape. To obtain the blanking pulse signals, the composite video signal is processed through conventional blanking extractor 3, the output of which is the composite blanking. Immediately thereafter the composite signal enters blanking pulse generator 4. The vertical and horizontal synchronization signals are processed by similarly conventional functional blocks, beginning with synchronization extractor 6. The composite synchronization signal is recorded on channel M and concurrently separated in block 7 into vertical and horizontal trigger pulses. The vertical and horizontal trigger pulses initiate their respective drive generators, 8 and 9, from which emanate clean, short duration, constant amplitude square wave pulses. The horizontal drive pulse is recorded directly on channel P of the recorder, while the vertical drive pulse is recorded in FM channel N. FM recording of the vertical drive maintains accuracy in the video frame synchronism, notwithstanding the comparatively low repetition frequency of these pulses, generally sixty Hertz. The significantly higher fundamental frequency of the horizontal drive pulses precludes the need for FM treatment during recording and reproduction.

The multi-channel longitudinal tape now contains a channel with the master video signal and four adjacent channels with timing components all in spatial registry. Undoubtedly, upon reproduction the spatial registry will result in temporal registry of the synchronization and video information signals.

The functional relationship of the channels and signals will be described in detail hereinafter with reference to the embodiment depicted in FIG. 2. As a prelude thereto, it is worth noting, summarily, that the precision timing signals, particularly the vertical synchronization, are available as a reference for special effects generation and supplemental video signal synchronization when such signals are to be mixed in temporal registry with the master video signal. Spatial registry is an inherent characteristic of the multi-channel longitudinal recorder.

The above-noted registry of signals on the various channels of a longitudinal recorder carries with it another functional attribute. Namely, temporal registry remains irrespective of the operating speed. Though changes in the tape speed, within a reasonable range, compress or expand the apparatus temporal duration of the recorded events, all synchronization and video signals remain fixed relative to each other. This allows X-Y monitor presentation of the video signals, which previously were tied to raster scan type displays.

Consider, now, the schematic block diagram in FIG. 2, showing the reproduction configuration of the apparatus. Though channels K, L, M, N and P of tape recorder 1 are shown as being operated in the reproduction mode, other channels such as A, B and C are simultaneously in a record mode. The signals emanating from the former group of channels are the prerecorded master video signals, with the vertical drive synchronization pulse on channel N fully demodulated. As shown, only channels A, B and C are recording, however it is clear that others of the available tape channels can be similarly selected as to mode.

Special effects generator 11 and second video source 12 are synchronized in perfect temporal registry to the master video signal. The video signals originating in these sources are recorded directly on channels A and B of the longitudinal tape, and also serve as inputs to selective video mixer 13. As shown by the data bus in the figure, master video synchronization data regulates the temporal activity of the video mixer. The output signals from video mixer 13 are a combination of the inputs, that is, a selective summation of master video signals, cueing or other symbology signals contributed by the special effects generator, and interjections of second video effects.

At this point one skilled in the art recognizes a first distinguishing attribute of using the longitudinal recorder. The successive degradation of the master video signal normally attendant multiple rerecordings is absent, since the master video remains unaltered. Repeatedly modified video signals, such as those on channel G, Can be recorded, extracted and rerecorded in perfect registry. In contrast, rerecorded composite video signals using conventional helical or disc recorders, degrade in signal quality and synchronization with each successive modification of the previously altered version. Though nominal video degradation can, in some cases, be tolerated, synchronization is not as forgiving.

The composite of the video signals leaving mixer 13 are available for recording or direct display, or both. As embodied, the video output signal is available to drive either conventional raster scan monitor 14 or the more versatile X-Y monitor 16. By design, raster scan monitor 14 has an internal sweep rate synchronized to the video when tape recorder 1 is operating at speed S1. For this speed of operation selector switch 17 routes the video mixer output to the raster scan monitor. Alterations of the master video resulting from special effects generator 11, second video source 12, and contributions from previously altered and recorded signal are viewed in real-time. Undoubtedly, this allows the operator to adjust all inputs to the mixer while monitoring the effect on the output video, and retain the results in synchronism by simultaneously rerecording on another channel.

A second beneficial aspect of using longitudinal tape recording apparatus becomes apparent to one moderately skilled in the art by noting the elements remaining. Slow motion video reproductions using conventional helical scan or disc recorders are created by multiple repeats of each frame. As the rate of motion is decreased, movements in the video presentation become visibly incremental. In contrast thereto, X-Y monitor 16, when operated jointly with the vertical and horizontal ramp generators, 18 and 19, synchronizes the monitor's scan rate with the slow motion tape speed of the longitudinal recorder.

Precision vertical and horizontal synchronization signals are obtained from longitudinal tape recorder channels N and P. FM recording and reproduction of the vertical drive overcomes the deficiencies inherent with tape recordings of low frequency. This approach is particularly important when reproduction occurs at frequencies below S1, since recorder frequency limitations would otherwise dominate the vertical synchronization problem. Since the composite video signals are in spatial and temporal registry with the drive signals, and ramp generators 18 and 19 are synchronized in rate to the speed of recorder 1, the slow speed video presentation on X-Y monitor 16 transitions smoothly between fields and frames.

Another beneficial aspect of the same apparatus focuses on elevated speed operation. Undoubtedly, one skilled in the art recognizes that the raster scan configuration of video display when operated in conjunction with a conventional helical scan or disc recorder is forced to sequentially omit frames of video to elevate the presentation speed above the standard raster scan corresponding to tape speed S1. An apparatus of the type shown, utilizing a multi-channel longitudinal recorder, however, inherently reproduces higher rates in a manner analogous to creating slow motion reproductions. Furthermore, since frames are not omitted, slight increases in presentation rate do not introduce immediate degrations in the quality of video presentation.

It is worth noting that the registry of the video and synchronization signals, including appropriately located blanking, on the various channels of the single longitudinal tape defines the central structural distinction from which the features of the invention flow. Intimately related, however, are synchronization signals carried on channels distinct from the composite video but in registry therewith, recorded and reproduced with a recognition of the broad frequency difference between the video and synchronization signals.

A typical X-Y Monitor is Hewlett-Packard Model 1317A High Speed Graphic Display. The elements shown in FIG. 1 may include Sync Stripper Model 302-2 manufactured by Colorado Video Inc. A Data Insertion Generator 603, also manufactured by Colorado Video, Inc., typifies the function of selective video mixer 13 in FIG. 2. Mixer 13 in FIG. 2 merely contains a greater number of input video channels, analogous to cascading multiple model 603 units. Reference is also made to the text entitled *Introduction to Solid State Television Systems Color and Black and White*, authored by Gerald H. Hansel, published by Prentice Hall copyright 1969, particularly chapter 7 on Microchrome Synchronizing Generators. Copies of the specification sheets for the above equipments referenced in this paragraph, and of the next chapter 7 may be found in the file of the parent application.

The broad concepts underlying this invention encompass other embodying variants. A logical example of such is a video mixer element which interleaves lines or frames of input video, rather than selectively summing the input signals to generate a composite output.

We claim:

1. Apparatus for recording and reproducing with superimposition of video signals, comprising:

a multiple channel, longitudinal tape recorder/reproducer capable of video frequency recording and reproduction, including a principal video channel and a plurality of synchronization channels, said synchronization channels including a horizontal drive channel and a vertical drive channel, the vertical drive channel having modulation means for accurately recording and reproducing low frequency vertical synchronization signals;

a video input to which is supplied a composite video signal, the apparatus having an initial record mode in which said video input is coupled to said principal video channel to record the picture signal, and means coupled to said video input during the initial record mode to extract the synchronization signals from said composite video signal and to record them on said synchronization channels, including means to separate the horizontal and vertical synchronization signals and to separately record them respectively to the horizontal and vertical drive channels; so that the picture and synchronization signals are in proper spatial registry on the same tape;

said apparatus further comprising a video mixer and additional video source means, and having an edit mode in which said principal channel and said synchronization channels are coupled for playback to input means of the video mixer, the synchronization channels being also coupled as inputs to the additional video source means, and the additional video source means has output means coupled to other input means of the video mixer, monitor means coupled to an output of the video mixer for visually displaying the combined video signal;

and further record means coupled to special channel means of said recorder/reproducer during said edit mode to simultaneously record a video signal including at least picture information from said additional video source, so that the signals on the special channel means are also in proper spatial registry on the same tape with said signals recorded on the principal and synchronization channels.

2. Apparatus as set forth in claim 1, wherein said tape recorder/reproducer may be operated at a plurality of speeds;

wherein said monitor means includes an X-Y video monitor having separate X, Y and Z inputs in which signals at the X input control horizontal scanning, signals at the Y input control vertical scanning and signals at the Z input control the picture level;

wherein said apparatus further includes a horizontal ramp generator and a vertical ramp generator which during said edit mode are coupled respectively from said horizontal and vertical device channels to said X and Y inputs, and said output of the video mixer being coupled to the Z input, the apparatus being operative so that regardless of the relation of the playback speed to the initial record speed, the picture signal at the Z input and also the synchronization signals at the X and Y inputs produce one and only one display of each and every frame.

3. Apparatus as set forth in claim 2, wherein said monitor means further includes a raster scan monitor which is coupled to said video mixer output during the edit mode when operating at a standard 30 frames per second.

4. Apparatus as set forth in any of claims 1, 2 or 3, wherein said synchronization channels further include a blanking pulse channel and a composite horizontal sync channel coupled to said means to extract the synchronization channels during the record mode; and wherein said modulation means of the vertical drive channel comprises frequency modulation.

5. Apparatus as set forth in claim 4, wherein said additional video source means includes a special effects generator which during the edit mode is coupled directly to one channel of said special channel means, as well as to an input of the video mixer.

6. Apparatus as set forth in claim 5, wherein said output of the video mixer is coupled during the edit mode to another channel of said special channel means.

7. Apparatus as set forth in claim 6, wherein said additional video source means further includes a second video source with an output coupled during the edit mode to a third channel of said special channel means, as well as to an input of the video mixer.

8. A method of recording and reproducing multiple video signals in synchronism, comprising the steps of:

extracting blanking pulse signals, vertical synchronization signals and horizontal synchronization signals from the composite master video signal;

recording on independent channels of a multiple channel tape recorder/reproducer the master video, the blanking pulse signals, the vertical synchronization signals and the horizontal synchronization signals, with the channel on which the vertical synchronization signals are recorded having modulation means to provide low frequency capability;

playing back and mixing the master video signal with supplemental video signals, synchronizing the operation with reproduced blanking pulse signals, the vertical synchronization signals and the horizontal synchronization signals, while simultaneously recording on a separate channel of the same tape an auxiliary video signal which includes said supplemental video signal, while leaving the master video and synchronization signals unmodified on their respective channels; and also monitoring the mixed video signals at the same time.

9. The method recited in claim 8, wherein said monitoring comprises displaying the mixed video presentation on an X-Y video monitor, further comprising the steps of generating horizontal and vertical video monitor sweep signals from the recorded horizontal and vertical synchronization signals and applying them respectively to X and Y inputs of said video monitor, the mixed video signals being supplied to a Z input of said video monitor, so that regardless of the relation of the playback speed to the initial record speed each and every frame is presented once and only once on the video monitor.

* * * * *